United States Patent [19]

Abe et al.

[11] Patent Number: 5,166,237
[45] Date of Patent: Nov. 24, 1992

[54] THERMOPLASTIC RESIN COMPOSITION

[75] Inventors: Hiroomi Abe; Taichi Nishio; Takashi Sanada; Noriyasu Kagawa, all of Chiba, Japan

[73] Assignee: Sumitomo Chemical Company, Ltd., Osaka, Japan

[21] Appl. No.: 482,629

[22] Filed: Feb. 20, 1990

Related U.S. Application Data

[63] Continuation-in-part of Ser. No. 340,735, Apr. 20, 1989, abandoned.

[51] Int. Cl.$^5$ ............................................. C08K 5/15
[52] U.S. Cl. .................................... 524/114; 524/321; 524/508; 524/514; 525/66; 525/109; 525/133; 525/142; 525/143
[58] Field of Search ............... 524/114, 508, 514, 321; 525/66, 109, 133, 142, 143

[56] References Cited

U.S. PATENT DOCUMENTS

| | | | |
|---|---|---|---|
| 3,379,792 | 4/1968 | Finholt | 525/397 |
| 3,917,554 | 11/1975 | Inoue et al. | 524/508 |
| 4,315,086 | 2/1982 | Ueno et al. | 525/391 |
| 4,600,741 | 7/1986 | Aycock et al. | 524/139 |
| 4,654,405 | 3/1987 | Jalbert et al. | 525/391 |
| 4,659,760 | 4/1987 | van der Meer | 524/141 |
| 4,659,763 | 4/1987 | Gallucci et al. | 524/358 |
| 4,732,937 | 3/1988 | Sybert | 525/92 |

FOREIGN PATENT DOCUMENTS

| | | |
|---|---|---|
| 0046040 | 2/1982 | European Pat. Off. |
| 0184151 | 11/1986 | European Pat. Off. |
| 0244090 | 4/1987 | European Pat. Off. |
| 0236593 | 9/1987 | European Pat. Off. |
| 59-59724 | 4/1984 | Japan |
| 59-86653 | 5/1984 | Japan |
| 62-236853 | 10/1987 | Japan |
| 63-108060 | 5/1988 | Japan |
| 63-113071 | 5/1988 | Japan |
| 1-139642 | 1/1989 | Japan |
| WO8505372 | 12/1985 | PCT Int'l Appl. |
| WO8700540 | 1/1987 | PCT Int'l Appl. |
| WO8806173 | 8/1988 | PCT Int'l Appl. |

*Primary Examiner*—Paul R. Michl
*Assistant Examiner*—John J. Guarriello
*Attorney, Agent, or Firm*—Cushman, Darby & Cushman

[57] ABSTRACT

A novel thermoplastic composition having improved paint adhesion strength comprising, A) from about 5 to 95 weight % of a6t least one polyphenylene ether.

B) from about 95 to 5 weight % of at least one polyamide,

C) paint adhesion improving amount of at least one paint adhesion improver selected from the class consisting of
  (1) homopolymers or copolymers of unsaturated nitrile compounds and
  (2) homopolymers or copolymers of alkyl (meth)acrylate, excluding an ethylene alkylacrylate copolymer having about 50 weight % or higher of ethylene, D) from about 0.01 to 30 parts by weight of at least one compatibilizer, based on 100 by weight of the total of the polyphenylene either and polyamide.

37 Claims, No Drawings

THERMOPLASTIC RESIN COMPOSITION

This is a continuation-in-part application Ser. No. 7/340,735, filed Apr. 20, 1989 now abandoned.

The present invention relates to novel polyphenylene ether-polyamide blends having improved paint adhesion Specifically, polyphenylene ether polyamide blends containing at least one paint adhesion improver selected from the class consisting of a) homopolymers or copolymers of unsaturated nitrile compounds and, b) alkyl(meth)acrylate homopolymers or copolymers as hereinafter defined, have improved paint adhesion as compared to polyphenylene ether polyamide blends without such an improver.

Blends of polyphenylene ether and polyamide have long been known. U.S. Pat. No. 3,379,792 taught improved processability of polyphenylene ethers by incorporating therein up to 25% by weight of polyamide.

Recently compatibility of such blends has been enhanced by incorporating therein a compatibilizing agent. U.S. Pat. No. 4,315,086 teaches the use of liquid diene polymers, epoxy compounds and compounds having in the molecule both (a) a carbon-carbon double bond or a carbon-carbon triple bond and (b) a carboxylic acid, acid anhydride, acid amide, imide, carboxylic acid ester, amino or hydroxyl group as compatibilizers EP 46040 teaches copolymers of vinyl aromatic compounds and either an alpha, beta-unsaturated dicarboxylic acid anhydride or an imide compound thereof as a compatibilizer.

U.S. Pat. No. 4,659,763 teaches the use of quinone compounds, U.S. Pat. No. 4,600,741 teaches the use of trimellitic anhydride acid chloride and the like, U.S. Pat. No. 4,659,760 teaches the use of oxidized polyethylene wax, WO 85/05372 teaches the use of polycarboxylic acids such as citric acid, WO 87/07281 teaches the use of vinyltrimethoxy silane as compatibilizers.

It is also known to add various rubbery polymers and copolymers to further enhance the impact strength of the foregoing compatibilized polyphenylene ether/polyamide blends.

While the foregoing compatibilized and ruber modified blends exhibit good mechanical properties, their paint adhesion are not entirely suitable for certain paint systems especially with no primer coating layer applied to a substrate fabricated from those blends.

It is an object of the present invention to provide polyphenylene ether polyamide composition of enhanced paint adhesion.

SUMMARY OF THE INVENTION

According to the present invention, polyphenylene ether-polyamide compositions having unexpectedly improved paint adhesion may be prepared by incorporating at least one paint adhesion improver selected from the class of polymeric materials consisting of a) homopolymers or copolymers of unsaturated nitrile compound, and b) alkyl(meth)acrylate homopolymers or copolymers In general the compositions of the present invention are (A) at least one polyphenylene ether and (B) at least one polyamide and (C) at least one paint adhesion improver selected from the class of polymeric materials consisting of a) homopolymers or copolymers of unsaturated nitrile compounds and b) alkyl(meth)acrylate homopolymers and copolymers (D) at least on compatibilizing agent. Especially preferred compatibilizing agents will be selected from the group consisting of a) liquid diene polymers b) epoxy compounds c) unsaturated functional compounds having in the molecule both (a) at least one carbon-carbon double bond or carbon-carbon triple bond and (b) at least one carboxylic acid, acid halide, anhydride, acid anhydride, acid anhydride halide, acid amide, acid ester, imido, amino or hydroxyl group d) aliphatic polycarboxylic acid compounds or the derivatives thereof having both (a) a group represented by the formula-(OR) wherein R is hydrogen or an alkyl, aryl, acyl or carbonyl dioxy group and (b) at least two groups, each of which may be the same or different, selected from carboxylic acid, acid halide, acid anhydride, anhydride, acid anhydride halide, acid ester, acid amide, imido amino and salts thereof e) polyfunctional acid halide compounds having both (a) an acid halide group and (b) a group selected from carboxylic acid, carboxylic acid anhydride, acid ester or acid amide and (E) optionally one or more of rubbery polymers or copolymers as an impact strength improver.

The composition of the present invention will generally be prepared from 5 to 95, preferably 30 to 70 percent by weight polyphenylene ether (A), and from about 5 to 95, preferably 30.to 70 percent by weight polyamide (B), 0.5 to 50, preferably 1 to 20 parts by weight of at least one of the paint adhesion improvers (C), based on 100 by weight of the total of the polyphenylene ether and polyamides, and, 0.01 to 30, preferably from about 0.1 to about 5 parts by weight of at least one compatibilizer based on 100 by weight of the total of the polyphenylene ether and polyamides.

When employed, the impact strength improver will generally be used in an amount of from about 2 to about 100 parts, preferably from about 5 to about 50 parts by weight based on 100 parts by weight of the total of the polyphenylene ether and polyamides.

DETAILED DESCRIPTION

The polyphenylene ether used in the present invention is homopolymer or copolymer composed of the following repeating unit (I) or (I) and (II):

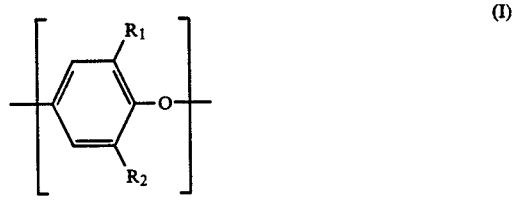

(I)

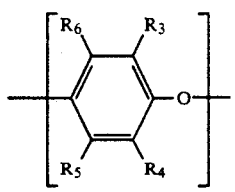

$$(II)$$

wherein $R_1$, $R_2$, $R_3$, $R_4$ $R_5$ and $R_6$ which may be identical or different each represents a monovalent residue such as an alkyl group of 1-4 carbon atoms excluding tert-butyl group, an aryl group, a halogen atom or a hydrogen atom, and $R_3$ and $R_5$ cannot be simultaneously hydrogen atom.

The polyphenylene ether may be a mixture of said homopolymer and said copolymer, or a graft copolymer of said polymer with styrene.

The homopolymer of polyphenylene ether includes poly(2,6-diethyl-1,4-phenylene)ether, poly(2-methyl-6-ethyl-1,4-phenylene)ether, poly(2,6-diethyl-1,4-phenylene)ether, poly(2-ethyl-t-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloro-1,4-phenylene)ether, poly(2-methyl-6-hydroxyethyl-1,4-phenylene)ether and poly(2-methl-6-chloroethyl-1,4-phenylene)ether.

The copolymer of polyphenylene ether includes polyphenylene ether copolymers mainly composed of polyphenylene ether structure which is obtained by copolymerization with o-cresol or an alkyl-substituted phenol such as 2,3,6-trimethylphenol which is represented by the formula (III):

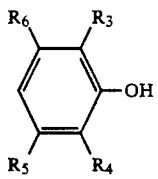

$$(III)$$

wherein $R_3$, $R_4$, $R_5$ and $R_6$ each represents a monovalent residue such as an alkyl group of 1-4 carbon atoms excluding tert-butyl group, an aryl group, a halogen atom or a hydrogen atom, and $R_3$ and $R_5$ cannot be simultaneously hydrogen atom.

The polyamide component (B) used in the present is well known in the art and may be selected from any of alliphatic polyamides or thermoplastic aromatic copolyamides or a combination thereof. The aliphatic polyamides have a molecular weight of 10,000 or more and can be produced by bonding of equimolar of a saturated aliphatic dicarboxylic acid of 4-12 carbon atoms and an aliphatic diamine of 2-12 carbon atoms. However, in the production, if necessary, the diamines may be excessively used so as to provide more amine terminal groups than carboxyl, terminal groups in the polyamide, or alternatively, a dibasic acid may be excessively used so as to provide more acid groups. similarly, these polyamides can be conveniently produced from acid production derivatives and amine production derivatives such as esters, acid chlorides and amine salts, of the above mentioned acids and amines.

Typical examples of the aliphatic dicarboxylic acid used for the production of the polyamides include adipic acid, pimelic acid, azelaic acid, suberic acid, sebacic acid and dodecanedioic acid.

On the other hand, typical examples of the aliphatic diamines include hexamethylenediamine and octamethylenediamine, and the like.

In addition, the aliphatic polyamides may also be produced by self-condensation of lactam.

Examples of the aliphatic polyamides are polyhexamethylene adipamide (nylon 66), polyhexamethylene azelamide (nylon 69), polyhexamethylene sebacamide (nylon 610), polyhexamethylene dodecanamide (nylon 612), poly-bis-(p-aminocyclohexl)methane dodecanoamide, polytetramethylene adipamide (nylon 46) and polyamides produced by ring cleavage of lactam such as polycaprolactam (nylon 6) and polylauryl lactam. Furthermore, there may be used polyamides produced by polymerization of at least two amines or acids selected from those used for the production of the above-mentioned polymers, for example, polymers produced from adipic acid, sebacic acid and hexamethylenediamine. The aliphatic polyamides further include blends of above-mentioned polyamides such as a blend of nylon 6 and nylon 66 including copolymers such as nylon 66/6.

Preferably, the aliphatic polyamides used in the present invention are polyhexamethylene adipamide (nylon 66), polycaprolactam (nylon 6) and a blend of polyhexamethylene adipamide (nylon 66) with poly-caprolactam (nylon 6).

The thermoplastic aromatic copolyamide is a copolyamide containing an aromatic component therein, for example, polyhexamethyle isophthalamide (nylon 6I). The copolyamide containing an aromatic component therein means a melt-polymerizable polyamide containing as a main component an aromatic amino acid and/or an aromatic dicarboxylic acid such as para-aminomethylbenzoic acid, para-aminoethylbenzoic acid, terephthalic acid and isophthalic acid.

Diamines which may constitute another component of the polyamide include hexamethylenediamine, undecamethylenediamine, dodecamethylenediamine, 2,2,4-/2,4,4-trimethylhexamethylenediamine, m-xylyenediamine, p-xylylenediamine, bis(p-aminocyclohexyl)methane, bis(p-aminocyclohexyl)propane, bis(3-methyl-4-aminocyclohexyl)methane, 1,3-bis-(aminomethyl) cyclo-hexane and 1,4-bis(aminomethyl)-cyclohexane. An isocyanate may also be used in place of the diamine.

Any other comonomers may be used, if necessary. Examples of the comonomers are 4,4'-diphenylmethane diisocyanate and tolylene diisocyanate. Other examples thereof are a unit of lactam, a unit of amino acid of 4-12 carbon atoms, a compound derived from an aliphatic dicarboxylic acid of 4-12 carbon atoms and an aliphatic diamines of 2-12 carbon atoms, for example, lactams and amino acids such as caprolactam, 11-aminoundecanoic acid and 12-aminododecanoic acid, and equimolar salts of the above-mentioned various diamines and adipic acid, azelaic acid or sebacic acid.

Typical examples of the thermoplastic aromatic copolyamides comprising these components are copolymer polyamide of p-aminomethylbenzoc acid and caprolactam (nylon AMBA/6), polyamides mainly composed of 2,2,4-/2,4,4-trimehylhexamethyl enediamine.-terephthalate (nylon TMDT and nylon TMDT/6I), polyamide mainly composed of hexamethylenediamine isophthalate and/or hexamethylenediamine.terephthalate and containing, as a comonomer, bis(p-aminocyclohexyl) methane.terephthalate, and/or bis(3-methyl 4-aminocyclohexyl) methane.isophthalate and/or bis(3-methyl-4-aminocyclohexyl) propane.isophthalate and/or bis(p-aminocyclohexyl) propane.terephthalate (nylon 6I/PACm I, nylon 6I/ DMPACM I, nylon 6I/PACP I, nylon 6I/6T/PACM I/PACm T, nylon 6I/6T/DMPACM I/DMPACM T, nylon 6I/6T/PACP I/PACP T), polyamides mainly composed of hexamethylene-diamine. isophthalate or hexamethylenediamineterephthalate and containing, as a comonomer, caprolactam, 12-aminododecanoic acid, hexamethylenediamine.adipate, bis(p-aminocyclohexyl) methane.adipate or bis(3-methyl,4-aminocyclohexyl) methane.adipate (nylon 6I, 6I/6T, 6I/12, 6T/6, 6T/66, 6I/PACM 6, 6I/DMPACM 6), and polyamides mainly composed of bis(p-aminocyclohexyl)methane.isophthalate or bis(3-methyl, 4-aminocyclohexyl)methane-isophthalate and containing, as a comonomer, hexamethylenediamine.dodecanedioate or 12-aminododecanoic acid (nylon PACM I/612 and nylon DMPACM I/12)

The aromatic nuclear-hydrogenated copolyamide of component (B) is an alicyclic copolyamide obtained by using cyclohexane 1,4-dicarboxylic acid or cyclohexane 1,3-dicarboxylic acid obtained by nuclear-hydrogenation of terephthalic acid or isophthalic acid in place of terephthalic acid or isophthalic acid which is an acid component of the above-mentioned aromatic copolyamides. Furthermore, nuclearhydrogenation product of diamines or diisocyanates such as 4,4'-diphenylmethane diisocyanate or tolylene diisocyanate, may also be used as a monomer.

The paint adhesion improver used for the practice of the present invention will be selected from the class of polymeric materials consisting of
a) homopolymers or copolymers of unsaturated nitrile compounds and
b) alkyl(meth)acrylate homopolymers or copolymers as hereinafter defined The homopolymers or copolymers of unsaturated nitrile compounds useful for the practice of the present invention are well known in the art.

The term "unsaturated nitrile compound" used herein means a compound having in its molecular structure at least one ethylenic carbon-carbon double bond or carbon-carbon triple bond and —C≡N radical. The preferred unsaturated nitrile compounds are acrylonitrile and methacrylonitrile. The most preferred unsaturated nitrile compound is acrylonitrile. The illustrative examples of the homopolymer of the unsaturated nitrile compounds are polyacrylonitrile (PAN) and polymethacrylonitrile.

The illustrative examples of the copolymer of the unsaturated nitrile compound are styrene acrylonitrile random copolymer, random copolymer of acrylonitrile and butadiene often called NBR, random copolymer of acrylonitrile and isoprene, random copolymer of acrylonitrile and alkyl (meth)acrylate including but not limited to acrylonitrile/ethylacrylate copolymer acrylonitrile/butylacrylate copolymer acrylonitrile/methylacrylate/butyl acrylate terpolymer, acrylonitrile/styrene/ethylacrylate terpolymer, graft copolymer of polybutadiene and acrylonitirle and styrene, often called ABS resin, and the like. It is desirable that these alkyl(meth)acrylate homopolymers or copolymers is in glassy state at room temperature, or has a modulus of elasticity of about 10,000 kg/cm². If these alkyl(meth)acrylate copolymers is in rubbery state at room temperature, it should be noted that copolymers or terpolymers of ethylene and alkyl(meth)acrylate having about 50% by weight or higher ethylene are excluded from the paint adhesion improver as defined herein since they exhibit lesser paint adhesion strength.

The alkyl(metha)acrylate homopolymers or copolymers useful for the practice of the present invention are well known in the art. The illustrative examples of the alkyl(meth) acrylate homopolymers or copolymers include polymethylmethacrylate, methylmethacrylate/styrene copolymer, graft copolymer of styrene, methylmethacrylate and polybutadiene, often called MBS, methylmethacrylate/methylacrylate copolymer methylmethacrylate/ethylacrylate copolymer, ethyacrylate/butylacrylate/methoxyacrylate terpolymer, methylmethacrylate/butylacrylate copolymer, ethylacrylate/butylacrylate copolymer, methylmethacrylate/glycidylmethacrylate copolymer, styrene/methylmethacrylate/glycidylmethacrylate terpolymer, copolymers of alkylacrylates and at least one crosslinkable comonomer often called acryl rubbers, and the like. Content of the unsaturated nitrile compound in the homopolymer or copolymer of the unsaturated nitrile compound is desirably 20–80% by weight. If it is less than 20% by weight, paint adhesion is not sufficiently improved, and if more than 80% by weight, much discoloration occurs after thermal ageing. The content of the unsaturated nitrile compound is more desirably 20–55% by weight. Obviously copolymers or terpolymers of an unsaturated nitrile compound and an alkyl(meth)acrylate may be understood as either copolymers of unsaturated nitrile compounds or copolymers of alkyl(meth)acrylates. The above mentioned paint adhesion improver may be employed alone or in any combination of one another.

Examples of preferred compatibilizing agents that may be employed in the practice of the present invention are
a) liquid diene polymers
b) epoxy compounds
c) unsaturated functional compounds
d) aliphatic polycarboxylic acid compounds or the derivatives thereof as described hereunder and,
e) polyfunctional acid halide compounds as described hereunder.

Liquid diene polymers suitable for use herein include homopolymers of a conjugated diene and copolymers of a conjugated diene with at least one monomer selected from the group consisting of other conjugated dienes; vinyl monomer, e.g. ethylene, propylene, butene-1, isobutylene, hexene-1, octene-1 and dodecene-1, and mixtures thereof, having a number average molecular weight of from 150 to 10,000 preferably 150 to 5,000. These homopolymers and copolymers include, among others, polybutadiene, polyisoprene, poly(1,3-pentadiene), poly(butadiene-isoprene), poly(styrene-butadiene), polychloroprene, poly(butadiene-alpha methyl styrene), poly(butadiene-styrene-isoprene), poly(butylene-butadiene) and the like.

Epoxy compounds suitable for use in the practice of the present invention there are given (1) epoxy resins produced by condensing polyhydric phenols (e.g. bisphenol-A, tetrabromobisphenol-A, resorcinol and hydroquinone) and epichlorohydrin; (2) epoxy resins produced by condensing polyhydric alcohols (e.g. ethylene glycol, propylene glycol, butylene glycol, polyethylene glycol, polypropylene glycol, pentaerythritol and trimethylolethane and the like) and epichlorohydrin; (3) glycidyletherified products of monohydric compounds including phenyl glycidylether, allyl glycidylether, butyl glycidylether and cresyl glycidylether; (4) glycidyl derivatives of amino compounds for example, the diglycidyl derivative of aniline, and (5) epoxidized products of higher olefinic or cycloalkene, or natural unsaturated oils (e.g. soybean) as well as of the foregoing liquid diene polymers.

The unsaturated functional compounds are those having in the molecule both (a) an ethylenic carbon-carbon double bond or a carbon-carbon triple bond and (b) at least one carboxylic acid, acid anhydride, acid halide, anhydride, acid halide anhydride, acid amide, acid ester, imide, amino, or hydroxy group. Examples of such unsaturated polyfunctional compounds are maleic acid; maleic anhydride; fumaric acid; citranoic acid; itaconic acid; maleimide; maleic hydrazine; reaction products resulting from a diamine and maleic anhydride, maleic acid, fumaric acid, etc.; dichloromaleic anhydride; maleic acidamide; unsaturated monocarboxylic acid (such as acrylic acid, butenoic acid, methacrylic acid, t-ethylacrylic acid, pentenoic acid); decenoic acids, undecenoic acids, dodecenoic acids, linoleic acid,); esters, acid amides or anhydrides of the foregoing unsaturated carboxylic acids including glycidyl(meth)acrylate; unsaturated alcohols (such as allyl alcohol, crotyl alcohol, methyl vinyl carbonol, 4-pentene-1-ol, 1,4-hexadiene-3-ol, 3-butene-1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is a positive integer up to 30), unsaturated amines resulting from replacing the —OH group(s) of the above unsaturated alcohols with $NH_2$ groups; and functionalized diene polymers and copolymers.

The aliphatic polycarboxylic acid compounds or the derivatives thereof

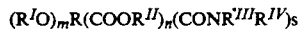

$(R^IO)_mR(COOR^{II})_n(CONR^{III}R^{IV})_s$ wherein R is a linear or branched chain, saturated aliphatic hydrocarbon of from 2 to 20, preferably 2 to 10 carbon atoms; $R^I$ is selected from the group consisting of hydrogen or an alkyl, aryl, acyl or carbonyl dioxy group of 1 to 10, preferably 1 to 6, most preferably 1 to 4 carbon atoms, especially preferred is hydrogen; each $R^{II}$ is independently selected from the group consisting of hydrogen or an alkyl or aryl group of from 1 to 20 carbon atoms, preferably from 1 to 10 carbon atoms; each $R^{III}$ and $R^{IV}$ is independently selected from the group consisting essentially of hydrogen or an alkyl or aryl group of from 1 to 10, preferably from 1 to 6, most preferably 1 to 4 carbon atoms; m is equal to 1 and (n+s) is greater than or equal to 2, preferably equal to 2 or 3, and n and s are each greater than or equal to zero and wherein $(OR^I)$ is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

Illustrative examples of suitable polycarboxylic acids are citric acid, maleic acid, and agaricic acid.

The polyfunctional acid halide compounds suitable for use herein are characterized as having both (a) at least one acid halide group, preferably acid chloride group and (b) at least one carboxylic acid, carboxylic acid anhydride, acid ester or acid amide group, preferably a carboxylic acid or carboxylic acid anhydride group. Examples of compatibilizers within this group are trimellitic anhydride acid chloride, chloroformyl succinic anhydride, and the like.

Examples of impact strength improver that may be employed in the practice of the present invention are,
a) polyolefins
b) ethylene/ olefin copolymer rubbers
c) ethylene/ olefin/polyene terpolymer rubbers
d) functionalized aforementioned olefin polymers by grafting at least one unsaturated functional compound thereto,
e) copolymers or terpolymers of ethylene and at least one unsaturated functional compound,
f) diene rubbers
g) hydrogenated or nonhydrogenated block copolymers of vinyl-aromatic compound and diene.

Polyolefins suitable for use in the practice of the present invention include high density polyethylene, low density polyethylene, linear low density polyethylene, polypropylene, crystalliene propylene ethylene copolymer, polybutene-1, polymethylpenten-1, polyisobutylene and the like. Ethylene/olefin copolymer rubbers for use in the practice of the present invention include ethylene/propylene copolymer rubber, often called EPR, ethylene/butene-1 copolymer rubber and the like. Ethylene/ olefin/polyene terpolymer rubbers for use in the practice of the present invention include ethylene/propylene/ethylidenenorbornen terpolymer rubber ethylene/propylene/dicyclopentadiene terpolymer rubber ethylene/propylene/1,4 hexadine terpolymer rubber and the like often called EPDM. Functionalized olefin polymers useful for the practice of the present invention include olefin polymers described in the above a), b), and c) with at least one unsaturated functional compound grafted thereto. The illustrative examples of the unsaturated functional compounds are acrylic acid, methacrylic acid, alkylester derivatives thereof, such as methyl(meth)acrylate, ethyl(meth)acrylate, butyl(meth)acrylate and the like, dicarboxylic acid or acid anhydride such as fumaric acid, maleic acid, maleic anhydride, itaconic acid and the like, acrylamide, N-(hydroxymethyl)acrylamide, glycidyl derivatives of (meth)acrylic acid such as glycidyl (meth)acrylate, vinyl acetate, vinyl chloride, styrene and the like. Method for the grafting of an unsaturated functional compound to the olefin polymers is not critical in the practice of the present invention and any known method in the art may be employed. Melt mixing of the olefin polymers and the unsaturated functional compounds with a suitable amount of a free radical iniator may be employed. Grafting of an unsaturated functional compound under an aqueous suspension of olefin polymers with a suitable amount of a free radical initiator and a dispersing agent may also be employed. Copolymers or terpolymers of ethylene and at least one unsaturated functional compound useful for the practice of the present invention include ethylene/(meth)acrylic acid copolymer ethylene/alkyl(meth)acrylate copolymer, ethylen/vinylacetate copolymer, ethylene/alkyl(meth)acrylate/maleicanhydride termpolymer, ethylene/methyl(meth)acrylate/glycidyl(meth)acrylate terpolymer and the like.

Diene rubbers useful for the practice of the present invention include polybutadiene, styrene butadiene random copolymer, often called SBR, natural rubber, polyisoprene, and the like.

Hydrogenated or nonhydrogenated block copolymers of vinyl aromatic compound and diene are well known in the art. Illustrative examples of the block copolymers are styrene butadiene diblockcopolymer, styrene isoprene diblock copolymer, styrene butadiene styrene triblock copolymer, styrene isoprene styrene triblock copolymer, radial teleblock copolymers of styrene and butadiene, hydrogenated products of the foregoing block copolymers and the like. The foregoing impact strength improver may be used alone or in any combination of one another.

The total amount of one or more of the compatibilizing agent used herein will be dependent on the specific compatibilizing agent selected. It is desirable to use at least necessary enough amount in enhancing the compatibility of the polyphenylene ether polyamide blend. Generally the amount of compatibilizing agent will be from about 0.01 to 30, preferably from about 0.1 to about 5 parts by weight per 100 parts by weight of the polyphenylene ether polyamide blend.

The total amount of one or more of the paint adhesion improver used herein will be dependent on the specific paint adhesion improver selected and the specific polymer blend system in question. It is desirable to use at least necessary enough amount in improving the polyphenylene ether polyamide blend. Generally the amount of the paint adhesion improver will be from about 0.5 to 40, preferably 1 to 20 parts by weight per 100 parts by weight of the polyphenylene ether polyamide blend.

Blending method of the components (A), (B) (C), (D), and if employed, (E) is not critical. Known melt kneading methods can be employed as the blending method. Extruders, kneaders, rolls and the like may be used. Preferably extruders can be used as melt kneading apparatuses. There is no special limitation in sequence of addition of the components upon melt kneading. That is, there are a method which comprises adding all of the components (A), (B), (C) and (D), at the same time and simultaneously melt-kneading them and a method which comprises pre-meltkneading components (A), (B) and (D) in the presence or absence of a free-radical initiator and then adding component (B) and melt-kneading them. When component (E) as an impact strength improver is added, there may be also the following methods: a method which comprises adding component (E) together with components (A), (B), (C), and (D) at the same time and simultaneously melt-kneading them; a method which comprises pre-meltkneading component (E) with components (A), (C) and (D) in the presence or absence of a free-radical initiator and then adding component (B), and melt-kneading them.

The foregoing polyphenylene ether polyamide blends may further comprise inorganic fillers such as talc, aluminosilicate, mica, carbon black, glass fiber and the like, pigments, heat stabilizers, ultraviolet degradation inhibitors, antioxidants, flame retardants, plasticizers and the like.

The molded products obtained from the thermoplastic resin composition of the present invention can be used suitably for automobile parts and electrical and electronic parts.

As examples of automobile parts to which the composition of the present invention can be applied, mention may be made of exterior trim parts such as bumper, fender, apron, hood panel, fascia, rocker panel, rocker panel reinforce, floor panel, rear quarter panel, door panel, door support, roof top, and trunk lid, interior trim parts such as instrument panel, console box, glove box, shift knob, pillar garnish, door trim, handle, arm rest, wind louver, carpet, seat belt, and seat, interior parts of engine room such as distributor cap, air cleaner, radiator tank, battery case, radiator shroud, washer tank, cooling fan, and heater case, mirror body, wheel cover, trunk trim, trunk mat and gasoline tank.

The following examples further illustrate the present invention, but the present invention is not limited to them.

In the preparation of the polyphenylene ether polyamide blends disclosed in the examples herein, a twin screw extruder TEX44 made by Nippon Seikosho Kabushiki Kaisha was used.

The extruder had L/D ratio of 32 and was equipped with a first feed opening at the position of L/D ratio of 1 and with a second feed opening at the position of L/D ratio of 16. (L: the length of the screw, D: the diameter of the screw)

The cylinder temperature was set at about 260° C. and screw speed was set at 360 rpm. The formulation of the individual blend was shown in Table 1. The paint adhesion strength measured of each blend was also shown in Table-1.

In table-1, compatibilizer and free radical initiator were shown in parts by weight per 100 parts of the total of the polymeric materials and each of the polymeric materials was shown in weight % of the total of the polymeric materials.

The ingredients listed in the column "Feed-1" of Table-1 were fed from the first feed opening. The ingredients listed in the column "Feed-2" of Table-1 were fed from the second feed opening. All ingredients fed together either from the first feed opening or the second feed opening were mixed well by a tumbler mixer prior to the feeding.

The feed rate of the first feed and the second feed were controlled by the automatic weight feed control system so as to maintain the formulation of the individual blend as specified in Table-1.

The polyphenylene ether employed in the examples was either polyphenylene ether having a reduced viscosity of 0.52 dl/g, (hereinafter denoted as PPE-A) or polyphenylene ether having a reduced viscosity of 0.42 dl/g (hereinafter denoted as PPE-B) measured at 25° C. in a chloroform solution of 0.5 g/dl concentration manufactured by Nippon Polyether Yugen Kaisha.

The polyamide 6, if employed, was Unitika Kabushiki Kaisha's Nylon 6 A1030 BRL throughout the examples. The polyamide 66, if employed, was UBE Kosan Kabushiki kaisha's UBE nylon 66 2015B.

The aromatic polyamides in the examples, if employed, was either EMS Chemie's Grivory ® XE3038 or Huels AG's Trogamid ® T 2010.

The free radical initiator, if employed, was dicumyl peroxide, Sanperox ® DCP made by Sanken Kako Kabushiki Kaisha. The free radical initiator, if employed, was always preblended with polyphenylene ether and fed from the first feed opening. Polyphenylene ether was always fed from the first feed opening and polyamides were always fed from the second opening.

The paint adhesion improver used in the examples were as follows;

(1) Acrylonitrile styrene copolymer (SAN) Sumitomo Naugatuck Kabushiki Kaisha's (hereinafter called as SNKK) Clearpet ® 1,000 (molecular weight; 140,000, acrylonitrile content; 23 weight %), if employed, was used.

(2) Acrylonitrile and styrene grafted polybutadiene (ABS) SNKK's Kralastic® S-3012 (hereinafter denoted as ABS-A) having about 50 weight % of polybutadiene and about 15 weight % of acrylonitrile or SNKK's Kralastic® S-2300A (hereinafter denoted as ABS-B) having about 30 weight % of polybutadiene and about 20 weight % of acrylonitrile, if employed, was used.

(3) Acryl rubber (AR)

Nippon Zeon Kabushiki Kaisha's Nipol®AR-32, if employed, was used as an acryl rubber (hereinafter denoted as AR). The rubber has mooney viscosity measured at 100° C. of about 40.

(4) Acrylonitrile butadiene rubber (NBR)

Nippon Zeon Kabushiki Kaisha's Nipol®, if employed, was used.

|  |  | Acrylonytrile content |
|---|---|---|
| NBR-A | Nipol® DN-002 | 53 wt % |
| NBR-B | Nipol® DN-115 | 42 wt % |
| NBR-C | Nipol® DN 402 | 23 wt % |
| NBR-D | Nipol® DN 401L | 18 wt % |

(5) Polymethylmethacrylate (PMMA)

Sumitomo Chemical Kabushiki Kaisha's Sumipex® LG, if employed, was used.

(6) Glycidylmethacrylate methylmethacrylate ethylacrylate terpolymer (hereinafter denoted as MEG)

Negami Kogyo Kabushiki Kaisha's High Pearl® MG-10 was used.

The polymer had about 10 weight % of glycidylmethacrylate and about 45 weight percent each of methylmethacrylate and ethylacrylate and the molecular weight of about 30,000.

(7) Polyacrylonitrile (PAN)

A copolymer of about 90 weight % acrylonitrile and about 10 weight % of methylacrylate having molecular weight of about 100,000, if employed, was used (hereinafter denoted as PAN)

The impact strength improver used in the examples were as follows.

1) Acrylamide grafted ethylene propylene copolymer rubber (EPR) denoted hereinafter as mEPR-A or maleated EPR denoted as mEPR-B, if employed, was prepared by first mixing 100 parts by weight of EPR (Esprene® E-120p), 0.1 Parts by weight of dicumylperoxide (DCP) as a free radical initiator and either 1.5 parts by weight of acrylamide or maleic anhydride (MAH) and then melt-extruding the premix at a temperature of about 230 degree centigrade utilizing the TEX44 twin screw extruder and pelletized, cooled and dried.

2) Styrene grafted EPR denoted hereinafter Sg-EPR, if employed, was prepared in the following manner.

In a 100 liter stainless steel autoclave, 10 Kg of EPR (Esprene 120p®) made by Sumitomo Chemical Co., Ltd.) and 35 Kg of demineralized water were fed and intensively stirred by a stirrer.

While stirring, a solution of 65 grams of benzonyl Peroxide in 3 Kg of styrene, and a solution of 400 grams of polyvinyl alcohol (Gosenol GL-05 made by Nihon Gosei Co., Ltd.) as a dispersion stabilizer in 10 Kg of demineralized water were added, in order.

The mixture was stirred for one hour at a room temperature to render the impregnation of styrene and the free radical initiator into the EPR. Then, the grafting reaction was allowed at 90 degree centigrade for 6 hours and subsequently at 115 degree centigrade for 2 hours.

After the reaction was over, the resulting product was filtered, washed with water and dried to obtain about 12.5 Kg of styrene grafted EPR (Sg-EPR).

Thus obtained Sg-EPR contained about 20 weight percent of polystyrene of which 33 weight percent was ungrafted free homopolystyrene.

3) Acrylamide grafted styrene grafted EPR denoted hereinafter as m-Sg-EPR, if employed, was prepared by first mixing 100 parts by weight of the Sg-EPR, 0.1 parts by weight of DCP and 1.5 parts by weight of acrylamide and then melt excluding the premix at a temperature of about 230 degree centigrade utilizing the TEX-44 twin screw extruder and pelletized, cooled and dried.

4) Styrene grafted EPDM denoted hereinafter as Sg-EPDM, if employed, was prepared in the following manner.

In a 100 liter stainless steel autoclave, 10 Kg of finely crashed EPDM (Esprene® 502 made by Sumitomo Chemical co., Ltd.) and 45 Kg of demineralized water were fed and intensively stirred by a stirrer. While stirring, a solution of 75 grams of benzoil peroxide in 4 Kg of styrene, and a solution of 400 grams of polyvinylalcohol (Gosenol GL-05) as a dispersion stabilizer in 10 Kg of demineralized water were added in order. The mixture was stirred for one hour at a room temperature to render the impregnation of styrene and the free radical initiator into the EPDM. Then the grafting reaction was allowed at 90 degree centigrade for 6 hours and subsequently at 115 degree centigrade for 2 hours.

After the reaction was over, the resulting product was filtered, washed with demineralized water and dried to obtain about 14 Kg of styrene grafted EPDM (Sg-EPDM). Thus obtained Sg-EPDM contained about 29 weight percent of polystyrene of which 8 weight percent was ungrafted free homopolystyrene.

5) Maleic anhydride grafted styrene grafted EPDM denoted hereinafter as mSg-EPDM was prepared by first mixing 100 parts by weight of Sg-EPDM and 1.5 parts by weight of maleic anhydride, 0.1 parts by weight of DCP and then melt extruding the premix in the same manner as mSg-EPR.

6) N-(hydroxymethyl)acrylamide grafted ethylenebutene-1 copolymer rubber hereinafter denoted as mEBR, if employed, was prepared by first mixing 100 parts by weight of ethylenebutene-1 copolymer rubber made by Sumitomo Chemical Co., Ltd. having about 30 weight % of butene-1 and the mooney viscosity measured at 120 degree centigrade of about 20, 0.1 parts by weight of DCP as a free radical initiator and 1.5 parts by weight of N-(hydroxymethyl)acrylamide and melt excluding the premix at a temperature of about 230 degree centigrade utilizing the TEX44 twin screw extruder and pelletized, cooled and dried.

7) Styrene grafted ethylene butene-1 copolymer rubber denoted hereinafter as Sg-EBR, if employed, was Prepared by substituting the EPR used in the preparation of Sg-EPR with the same EBR as used in the preparation of mEBR.

All other procedure and operating conditions were maintained in the same manner as described in the preparation of Sg-EPR.

8) Shell Kagaku's Kraton D1101, if employed in any of the examples, was used as a styrene butadiene triblock copolymer denoted hereinafter as SBS.

9) Shell Kagaku's Kraton G1701, if employed in any of the examples, was used as a hydrogenated styrene isoprene diblock copolymer denoted hereinafter as SEP.

10) Norsolor's Lotader 4700, if employed in any of the examples, was used as an ethylene-ethylacrylate maleic anhydride terpolymer denoted hereinafter as LOT.

11) Sumitomo Chemical Co., Ltd.'s glycidylmethacrylate methylacrylate ethylene terpolymer having 3 weight Percent of glycidylmethacrylate, 30 weight percent of methyl acrylate and the balance being ethylene, if employed in any of the examples, was used as a terpolymer of ethylene, glycidylmethacrylate and methylacrylate (hereinafter denoted as EGMA).

Polystyrene, if employed in any of the examples herein was either Nippon Polystyrene Kabushiki Kaisha's Esbrite® T8K (crystal polystyrene denoted as T8K hereinafter) or Esbrite® 500HR-Y3 (highimpact polystyrene denoted as HIPS hereinafter).

The paint adhesion test was performed in the following manner;

1) The granules of each of the blends prepared according to the formulation listed in Table-1 to be tested were always dried at 100 degree centigrade for 6 hours with preheated dry air stream, the dew point of which was about −40 degree centigrade, and cooled thereafter by room temperature dry air stream.

2) The blend granules were injection molded to form a test plates of 150 milimeter×150 milimeter×3 milimeter size at a temperature range of about 290 degree centigrade.

3) The resulting plates were subjected to a paint spray utilizing a paint spray gun to form a paint layer of about 25 microns.

4) The paint coated plates were then cured for 30 minutes at 70 degree centigrade in a infrared Paint cure oven.

5) The paint layer peeling test was performed 1 hr, 2 hr, 5 hr, 12 hr, and 24 hr after the paint curing.

The cured paint layer was cross cut by a sharp edged knife so as to make one hundred of 2 mm by 2 mm square pieces of the layer. Then a sheet of adhesive tape was applied on to the cross cut surface and the tape was peeled off.

The paint adhesion strength was measured by counting the number of about 2 mm by 2 mm square pieces remained unpeeled off, out of the 100 cross cut pieces.

6) The paint used in the examples was "Origiplate Z-NY metalic silver" manufactured by Origin Denki Kabushiki Kaisha.

The heat discoloration test was performed in the following manner:

1) Plates of 150 mm×150 mm×30 mm (thickness) were stood in a Geer's oven at 160° C. for 1 hour, and then were took out to evaluate degree of discoloration.

2) Evaluation:Degree of discoloration: Great←X,Δ, ○→Little

EXAMPLE 1

15 Kg of polyphenylene ether (PPE-A), 0.25 Kg of maleic anhydride (MAH), 5 grams of dicumylperoxide (DCP), and 10 Kg of ABS-A were premixed as prescribed in the Feed-1 column of Example-1 of Table-1, using a 100 liter tumbler mixer blending the ingredients for 3 minutes prior to the feeding to the first feed opening of the TEX-44 twin screw extruder.

The premix prepared for the first feed opening will be referred to as the first feed premix hereinafter. 20 Kg of the nylon 6 and 5 Kg of the nylon 66 were premixed as prescribed in the Feed-2 column of Example 1 of Table-1 using the same tumbler mixer for 3 minutes prior to the feeding to the second feed opening of the TEX-44 twin screw extruder.

The premix prepared for the second feed opening will be referred to as the second feed premix hereinafter. The cylinder temperature of the extruder was set at about 260° C. and the screw speed, at about 360 rpm. The first feed premix was fed to the first feed opening at a rate of 20.2 Kg/Hr and the second feed premix was fed to the second feed opening at a rate of 20 Kg/Hr so as to maintain the formulation of the ingredients shown in Example-1.

The resulting blend was cooled in a water bath by chilled water of about 10° C. and pelletized and dried. Thus prepared blend granules were injection molded to make plates of 150 mm×150 mm×30 mm test specimen.

The paint adhesion strength was tested with 5 of the plates according to the test method described before. The average of the paint adhesion strength measured of the five plates was shown in the table 1.

EXAMPLE 2

The experiment was conducted in the same manner as in Example 1 except that ABS-A was substituted with SAN.

COMPARATIVE EXAMPLE 1

The experiment was conducted in the same manner as in Example 1 except that ABS-A was substituted with crystal polystyrene (T8K).

EXAMPLES 3 through 22 and COMPARATIVE EXAMPLES 2 through 7.

The experiments were conducted in the same manner as in Example-1 except that (1) About 20.25 Kg each of the first feed premix was prepared according to the formulation shown in Feed-1 column of each of the examples.

(2) 20 Kg each of the second feed premix was prepared according to the formulation shown in Feed-2 column of each of the examples.

|  |  | Example (EX) 1 | EX 2 | Comparative EX 1 | EX 3 | EX 4 | EX 5 | EX 6 | Comparative EX 2 | EX 7 | EX 8 |
|---|---|---|---|---|---|---|---|---|---|---|---|
| Feed-1 | PPE-A | 30 | 30 | 30 | — | — | — | 0 | — | 35 | 35 |
|  | PPE-B | — | — | — | 40 | 40 | 40 | 40 | 40 | — | — |
|  | Conpatibilizer | MAH 0.5 | MAH 0.5 | MAH 0.5 | Fumaric acid 0.5 | Fumaric acid 0.5 | Fumaric acid 0.5 | Fumaric Acid 0.5 | Fumaric Acid 0.5 | MAH 0.5 | MAH 0.5 |
|  | Freeradical initiator | 0.01 | 0.01 | 0.01 | — | — | — | — | — | — | — |

-continued

| | | | | | | | | | | | |
|---|---|---|---|---|---|---|---|---|---|---|---|
| | Paint adhesion improver | ABS-A 20 | SAN 20 | — | ABS-B 5 | NBR-A 5 | PMMA 5 | ABS-A 3 | — | ABS-B 5 | NBR-A 5 |
| | Impact strength improver | — | — | — | mEPR-A 5 | mEPR-A 5 | mEPR-A 5 | mEPR-B 5 | mEPR-B 5 | Sg-EBR 10 | mSg-EPR 10 |
| | Polystyrene | — | — | T8K 20 | — | — | — | — | — | — | — |
| Feed-2 | Nylon 6 | 40 | 40 | 40 | 40 | 40 | 40 | 40 | 40 | 45 | — |
| | Nylon 66 | 10 | 10 | 10 | 10 | 10 | 10 | 10 | 10 | — | — |
| | Aromatic polyamide | — | — | — | — | — | — | — | — | — | Grivory 45 |
| | Paint adhesion improver | — | — | — | — | — | — | NBR-A 2 | — | — | — |
| | Impact strength improver | — | — | — | — | — | — | — | — | — | — |
| | Polystyrene | — | — | — | — | — | — | — | — | HIPS 5 | HIPS 5 |
| Paint adhesion strength | 1 hr | 59 | 96 | 0 | 0 | 0 | 0 | 0 | 0 | 43 | 5 |
| | 2 hr | 62 | 97 | 0 | 0 | 0 | 0 | 0 | 0 | 58 | 42 |
| | 5 hr | 82 | 99.8 | 74 | 21 | 9 | 11 | 28 | 0 | 83 | 63 |
| | 12 hr | 96 | 100 | 92 | 58 | 28 | 27 | 46 | 12 | 90 | 81 |
| | 24 hr | 99.9 | 100 | 96 | 90 | 78 | 79 | 85 | 25 | 98 | 90 |

| | | EX 9 | EX 10 | Comparative EX 3 | EX 11 | Comparative EX 4 | EX 12 | EX 13 | Comparative EX 5 | EX 14 | EX 15 |
|---|---|---|---|---|---|---|---|---|---|---|---|
| Feed-1 | PPE-A | 40 | 40 | 40 | — | — | — | — | — | — | — |
| | PPE-B | — | — | — | 40 | 40 | 40 | 40 | 40 | 40 | 40 |
| | Conpatibilizer | MAH 0.5 | MAH 0.5 | MAH 0.5 | Citric acid 0.5 | Citric acid 0.5 | MAH 0.5 | MAH 0.5 | MAH 0.5 | MAH 0.5 | MAH 0.5 |
| | Freeradical initiator | 0.1 | 0.1 | — | — | — | 0.01 | 0.01 | 0.01 | — | — |
| | Paint adhesion improver | — | — | — | — | — | NBR-A 5 | AR 5 | — | NBR-A 5 | ABS-B 5 |
| | Impact strength improver | mSg-EPDM 10 | mSg-EPDM 10 | mSg-EPDM 10 | SEP 10 | SEP 10 | mEBR 5 | mEBR 5 | mEBR 10 | Sg-EPR 5 | Sg-EPR 5 |
| | Polystyrene | — | — | — | — | — | — | — | — | — | — |
| Feed-2 | Nylon 6 | 44 | 45 | 45 | — | — | 45 | 45 | 45 | 44 | 44 |
| | Nylon 66 | — | — | — | — | — | — | — | — | — | — |
| | Aromatic polyamide | Trogamid 1 | — | — | Trogamid 45 | Trogamid 45 | — | — | — | Grivory 1 | Trogamid 1 |
| | Paint adhesion improver | NBR-A 5 | PMMA 5 | — | AR 5 | — | — | — | — | — | — |
| | Impact strength improver | — | — | — | — | — | LOT 5 | EGMA 5 | LOT 5 | SBS 5 | SBS 5 |
| | Polystyrene | — | HIPS 5 | — | HIPS 5 | — | — | — | — | — | — |
| Paint adhesion strength | 1 hr | 7 | 9 | 0 | 58 | 0 | 0 | 0 | 0 | 19 | 59 |
| | 2 hr | 49 | 48 | 0 | 61 | 0 | 0 | 0 | 0 | 48 | 60 |
| | 5 hr | 68 | 73 | 21 | 85 | 58 | 8 | 23 | 0 | 72 | 86 |
| | 12 hr | 83 | 86 | 38 | 92 | 72 | 29 | 47 | 0 | 89 | 91 |
| | 24 hr | 92 | 94 | 60 | 99.1 | 89 | 76 | 89 | 21 | 95 | 99 |

| | | Comparative EX 6 | EX 16 | EX 17 | Comparative EX 7 | EX 18 | EX 19 | EX 20 | EX 21 | EX 22 |
|---|---|---|---|---|---|---|---|---|---|---|
| Feed-1 | PPE-A | — | 40 | 40 | 40 | — | — | — | — | — |
| | PPE-B | 40 | — | — | — | 40 | 40 | 40 | 40 | 40 |
| | Conpatibilizer | MAH 0.5 | MAH 0.5 | MAH 0.5 | MAH 0.5 | Fumaric acid 0.5 | Fumaric acid 0.5 | Fumaric acid 0.5 | Fumaric acid 0.5 | Fumaric acid 0.5 |
| | Freeradical initiator | — | — | — | — | — | — | — | — | — |
| | Paint adhesion improver | — | PAN 5 | MEG 5 | — | PAN 5 | NBR-A 5 | NBR-B 5 | NBR-C 5 | NBR-D 5 |
| | Impact strength improver | Sg-EPR 10 | mEPR-A 5 | mEPR-B 5 | mEPR-B 5 | SBS 10 | SBS 10 | SBS 10 | SBS 10 | SBS 10 |
| | Polystyrene | — | — | — | HIPS 5 | — | — | — | — | — |
| Feed-2 | Nylon 6 | 44 | 40 | 40 | 40 | 45 | 45 | 45 | 45 | 45 |
| | Nylon 66 | — | 5 | 5 | 5 | — | — | — | — | — |
| | Aromatic polyamide | Trogamid 1 | — | — | — | — | — | — | — | — |
| | Paint adhesion improver | — | — | — | — | — | — | — | — | — |
| | Impact strength improver | SBS 5 | mSg-EPDM 5 | mSg-EPR 5 | mSg-EPR 5 | — | — | — | — | — |

-continued

|  |  | 5 |  |  |  |  |  |  |  |  |
|---|---|---|---|---|---|---|---|---|---|---|
| Polystyrene | — |  | — | — | — | — | — | — | — | — |
| Paint | 1 hr | 0 | 0 | 0 | 0 | 23 | 21 | 11 | 5 | 0 |
| adhesion | 2 hr | 0 | 0 | 0 | 0 | 52 | 50 | 38 | 23 | 0 |
| strength | 5 hr | 40 | 13 | 7 | 0 | 71 | 72 | 58 | 48 | 25 |
|  | 12 hr | 61 | 47 | 29 | 0 | 89 | 88 | 75 | 61 | 41 |
|  | 24 hr | 80 | 81 | 74 | 11 | 97 | 96 | 92 | 85 | 59 |
| Heat discoloration |  |  |  |  |  | × | △ | ○ | ○ | ○ |

We claim:

1. A thermoplastic composition, having improved paint adhesion strength comprising,
   A) from about 5 to 95 weight % of at least one polyphenylene ether,
   B) from about 95 to 5 weight % of at least one polyamide,
   C) paint adhesion improving amount of at least one paint adhesion improver selected from the class consisting of
      (1) homopolymers or copolymers of unsaturated nitrile compounds and
      (2) homopolymers or copolymers of alkyl (meth)acrylate, excluding an ethylene alkylacrylate copolymer having about 50 weight % or higher of ethylene,
   D) from about 0.01 to 30 parts by weight of at least one compatibilizer, based on 100 by weight of the total of the polyphenylene ether and polyamide.

2. A thermoplastic composition according to claim 1 wherein the said paint adhesion improver is incorporated in the amount from about 0.5 to 30 parts by weight based on the total of the polyphenylene ether and polyamide.

3. A thermoplastic composition according to claim 2 wherein the said unsaturated nitrile compounds are acrylonitrile and/or methacrylonitrile.

4. A thermoplastic composition according to claim 3 wherein polyphenylene ether is poly(2,6 dimethyl -1, 4-phenylene) ether or a copolymer of 2,6 dimethylphenol and 2,3, 6 trimethylphenol or a combination thereof.

5. A thermoplastic composition according to claim 4 wherein polyamide is polyamide 6.

6. A thermoplastic composition according to claim 4 wherein polyamide is polyamide 66.

7. A thermoplastic composition according to claim 4 wherein polyamide is a blend of polyamide 6 and polyamide 66.

8. A thermoplastic composition according to claim 4 wherein polyamide is an amorphous polyamide.

9. A thermoplastic composition according to claim 4 wherein polyamide is a blend of polyamide 6 and an amorphous polyamide.

10. A thermoplastic composition according to claim 4 wherein polyamide is a blend of polyamide 66 and an amorphous polyamide.

11. A thermoplastic composition according to claim 4, wherein, the unsaturated nitrile compound is acrylonitrile; and the polyamide is polyamide 6, polyamide 6, an amorphous polyamide, or a blend thereof.

12. A thermoplastic composition according to claim 11 wherein the paint adhesion improver is styrene acrylonitrile copolymer (SAN).

13. A thermoplastic composition according to claim 11 wherein the paint adhesion improver is a styrene and acrylonitrile grafted polybutadiene (ABS).

14. A thermoplastic composition according to claim 11 wherein the paint adhesion improver is an acrylonitrile and at least one alkyl(meth)acrylate copolymer.

15. A thermoplastic composition according to claim 4 wherein the paint adhesion improver is polymethylmethacrylate; and said polyamide is polyamide 6, polyamide 66, an amorphous polyamide or a blend thereof.

16. A thermoplastic composition according to claim 4 wherein the paint adhesion improver is a copolymer or terpolymer among alkyl(meth)acrylates; and the polyamide is polyamide 6, polyamide 66, an amorphous polyamide or a blend thereof.

17. A thermoplastic composition according to claim 11 wherein the paint adhesion improver is a an acrylic rubber having a crosslinkable comonomer therein.

18. A thermoplastic composition according to claim 11 wherein the paint adhesion improver is a combination of an acrylonitrile polymer and an alkyl(meth)acrylate polymer.

19. Substrate having improved paint adhesion strength fabricated from a thermoplastic composition according to claim 1.

20. A method to improve paint adhesion strength of a substrate fabricated from a thermoplastic composition comprising:
   (A) from about 5 to 95 weight % of at least one polyphenylene ether,
   (B) from about 95 to 5 weight % of at least one polyamide,
   (C) from about 0.01 to 30 parts by weight of at least one compatibilizer, based on 100 by weight of the total of the polyphenylene either and polyamide,
   said method of improving paint adhesion to said substrate comprising adding to said composition
   (D) an amount effective to improve paint adhesion of a paint adhesion improver selected from the group consisting of:
      (1) homopolymers or copolymers of unsaturated nitrile compounds;
      (2) homopolymers or copolymers of alkyl (meth)acrylate, excluding an ethylene alkylacrylate copolymer having about 50 weight % or higher or ethylene; and,
      (3) combinations thereof.

21. A method according to claim 20 wherein the said paint adhesion improver is incorporated in the amount from about 0.5 to 30 parts by weight based on the total of the polyphenylene ether and polyamide.

22. A method according to claim 21 wherein the said unsaturated nitrile compounds is selected from the group consisting of acrylonitrile, methacrylonitrile and a combination thereof.

23. A method according to claim 22 wherein the polyphenylene ether is selected from the group consisting of poly (2,6 dimethyl -1, 4-phenylene) ether, a copolymer of 2, 6 dimethylphenol and 2, 3, 6 trimethylphenol, and a combination thereof.

24. A method according to claim 23 wherein polyamide is polyamide 6.

25. A method according to claim 23 wherein polyamide is polyamide 66.

26. A method according to claim 23 wherein polyamide is a blend of polyamide 6 and polyamide 66.

27. A method according to claim 23 wherein polyamide is an amorphous polyamide.

28. A method according to claim 23 wherein polyamide is a blend of polyamide 6 and amorphous polyamide.

29. A method according to claim 23 wherein polyamide is a blend of polyamide 66 and an amorphous polyamide.

30. A method according to claim 23, wherein the unsaturated nitrile compound is crylonitrile; and the polyamide is polyamide 6, polyamide 66, an amorphous polyamide, or a blend thereof.

31. A method according to claim 30 wherein the paint adhesion improver is styrene acrylonitrile copolymer (SAN).

32. A method according to claim 30 wherein the paint adhesion improver is a styrene and acrylonitrile grafted polybutadiene (ABS).

33. A method according to claim 30 wherein the paint adhesion improver is an acrylonitrtile and at least one alkyl(meth)acrylate copolymer.

34. A method according to claim 23 wherein the paint adhesion improver is polymethylmethacrylate; and said polyamide is polyamide 6, polyamide 66, an amorphous polyamide or a blend thereof.

35. A method according to claim 23 wherein the paint adhesion improver is a copolymer or terpolymer among alkyl(meth) acrylates; and the polyamide is polyamide 6, polyamide 66, an amorphous polyamide, or a blend thereof.

36. A method according to claim 30 wherein the paint adhesion improver is an acrylic rubber having a cross-linkable comonomer therein.

37. A method according to claim 30 wherein the paint adhesion improver is a combination of an acrylonitrile polymer and an alkyl(meth)acrylate polymer.

* * * * *